DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 1, 1971

827 O.G. 7

T887,016
PHOTOGRAPHIC MATERIALS
Kirby M. Milton, Victor, N.Y.
(Kodak Park, Rochester, N.Y. 14650)
Filed Nov. 16, 1970, Ser. No. 90,123
**Int. Cl. G03c *1/28***
U.S. Cl. 96—107
No Drawing. 19 Pages Specification

High contrast photographic silver halide emulsions comprising unfogged silver halide grains, the halide of the silver halide being at least 50 mol percent chloride, have on the surface thereof a halogen acceptor and a sufficient quantity of iodide to effectively increase the speed of said silver halide, said quantity of iodide being in addition to any iodide present in said grains as mixed silver halide. Preferably, the iodide is added to the grains in the form of a water-soluble salt, e.g., an alkali metal or ammonium iodide. The halogen-accepting compounds have an anodic polarographic half-wave potential less than 0.85 volt and a cathodic polarographic half-wave potential more negative than —1.0 volt. Merocyanine halogen acceptors give good results. The iodide salt is preferably potassium iodide employed in the emulsion at a concentration of about .1 to 3 grams per mole of silver halide; the emulsion is preferably a fine grain emulsion having an average grain size less than about .5 micron; and, the halogen acceptor is preferably the merocyanine dye 1-carboxymethyl-5-[(3-ethyl - 2-benzoxazolinylidene)ethylidene]-3-phenyl-2-thiohydantoin, which is advantageously used at about 450 mg. per mole of silver halide.